(12) United States Patent
Derscheid et al.

(10) Patent No.: US 11,825,775 B2
(45) Date of Patent: Nov. 28, 2023

(54) ROUND BALER WITH BALE HOLDER IN GATE

(71) Applicant: DEERE & COMPANY, Moline, IL (US)

(72) Inventors: Daniel E. Derscheid, Hedrick, IA (US); Austin J. Jones, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 336 days.

(21) Appl. No.: 16/932,881

(22) Filed: Jul. 20, 2020

(65) Prior Publication Data

US 2022/0015300 A1  Jan. 20, 2022

(51) Int. Cl.
*A01F 15/08* (2006.01)
*A01F 15/07* (2006.01)

(52) U.S. Cl.
CPC .......... *A01F 15/0883* (2013.01); *A01F 15/07* (2013.01); *A01F 2015/077* (2013.01); *A01F 2015/0891* (2013.01)

(58) Field of Classification Search
CPC .................. A01F 15/0883; A01F 15/07; A01F 2015/077; A01F 2015/0891
See application file for complete search history.

(56) References Cited

U.S. PATENT DOCUMENTS

| | | | |
|---|---|---|---|
| 972,884 A | 10/1910 | Franklin | |
| 4,334,467 A * | 6/1982 | Nishibe | A01F 15/07 56/341 |
| 4,375,187 A | 3/1983 | Kluver et al. | |
| 4,391,187 A | 7/1983 | Koning et al. | |
| 4,393,764 A | 7/1983 | Viaud | |
| 4,407,190 A * | 10/1983 | Cheatum | A01F 15/0883 100/88 |
| 4,433,619 A | 2/1984 | Anstey et al. | |
| 4,491,190 A | 1/1985 | Mayfield | |
| 4,584,827 A | 4/1986 | Merkey et al. | |

(Continued)

FOREIGN PATENT DOCUMENTS

| | | | | |
|---|---|---|---|---|
| DE | 3234748 A | * | 3/1984 | A01F 15/07 |
| EP | 0130258 A1 | | 1/1985 | |

(Continued)

OTHER PUBLICATIONS

Extended European Search Report and Written Opinion issued in European Patent Application No. 21184992.2, dated Dec. 13, 2021, in 08 pages.

*Primary Examiner* — Arpad F Kovacs

(57) ABSTRACT

A round baler includes a housing, and a gate rotatably attached to the housing. A bale holder is attached to and moveable with the gate. The bale holder includes a retractable member that is moveable between an engaged position operable to grasp a bale and move the bale with the gate, and a disengaged position operable to release the bale. The retractable member is positioned to grasp an end face of the bale at a contact location. The contact location is disposed rearward of a vertical reference plane passing through a centerline of the bale when the bale is within an interior region of the round baler and the gate is in the closed position. The contact location may be disposed below a horizontal plane passing through the centerline of the bale when the bale is within the interior region and the gate is in the closed position.

29 Claims, 11 Drawing Sheets

(56) References Cited

U.S. PATENT DOCUMENTS

| | | | |
|---|---|---|---|
| 4,759,278 A | 7/1988 | Viaud | |
| 4,821,637 A * | 4/1989 | Viaud | A01F 15/0883 100/88 |
| 4,889,047 A * | 12/1989 | Ardueser | A01F 15/0883 100/88 |
| 5,115,734 A | 5/1992 | Quartaert | |
| 5,129,208 A | 7/1992 | Van Zee | |
| 5,367,865 A | 11/1994 | Jennings et al. | |
| 5,598,690 A * | 2/1997 | McClure | A01F 15/07 100/88 |
| 6,457,295 B1 | 10/2002 | Arnold | |
| 6,843,170 B1 | 1/2005 | Guthmann et al. | |
| 7,024,989 B2 | 4/2006 | Preece | |
| 7,064,282 B2 | 6/2006 | Viaud et al. | |
| 7,091,425 B2 | 8/2006 | Viaud et al. | |
| 7,114,435 B2 * | 10/2006 | Viaud | A01F 15/07 100/88 |
| 7,140,294 B1 | 11/2006 | Anstey et al. | |
| 7,520,215 B1 * | 4/2009 | Merritt | A01F 15/07 100/88 |
| 7,703,391 B2 | 4/2010 | Duenwald et al. | |
| 9,297,688 B2 | 3/2016 | Posselius et al. | |
| 10,036,663 B2 | 7/2018 | Smith | |
| 10,813,291 B2 * | 10/2020 | Kraus | A01F 15/071 |
| 11,051,456 B2 * | 7/2021 | Sloan | A01F 15/08 |
| 11,160,216 B2 * | 11/2021 | Lebeau | A01F 15/0883 |
| 2004/0089483 A1 * | 5/2004 | Viaud | A01F 15/0833 177/136 |
| 2004/0250708 A1 * | 12/2004 | Preece | A01F 15/0883 100/177 |
| 2005/0241499 A1 | 11/2005 | Viaud et al. | |
| 2007/0101874 A1 | 5/2007 | Viaud | |
| 2009/0146438 A1 * | 6/2009 | Viaud | A01F 15/0833 292/300 |
| 2010/0326294 A1 | 12/2010 | Smith et al. | |
| 2013/0020811 A1 * | 1/2013 | Simmons | A01F 15/07 292/69 |
| 2016/0165801 A1 * | 6/2016 | Posselius | A01F 15/07 56/341 |
| 2019/0141901 A1 | 5/2019 | Hackert et al. | |
| 2020/0205348 A1 | 7/2020 | Sloan et al. | |

FOREIGN PATENT DOCUMENTS

| | | | |
|---|---|---|---|
| EP | 1034695 A1 * | 9/2000 | A01F 15/0833 |
| EP | 1446998 B1 | 8/2009 | |
| EP | 2100498 A2 * | 9/2009 | A01F 15/0883 |
| EP | 2661953 A1 | 11/2013 | |
| EP | 3174380 B1 * | 12/2018 | A01F 15/0825 |
| EP | 3266299 B1 | 3/2019 | |
| EP | 3677113 A1 | 7/2020 | |
| FR | 2621446 A1 | 4/1989 | |
| WO | WO 9703550 | 2/1997 | |
| WO | WO 2014194287 | 12/2014 | |
| WO | WO 2021001456 | 1/2021 | |

* cited by examiner

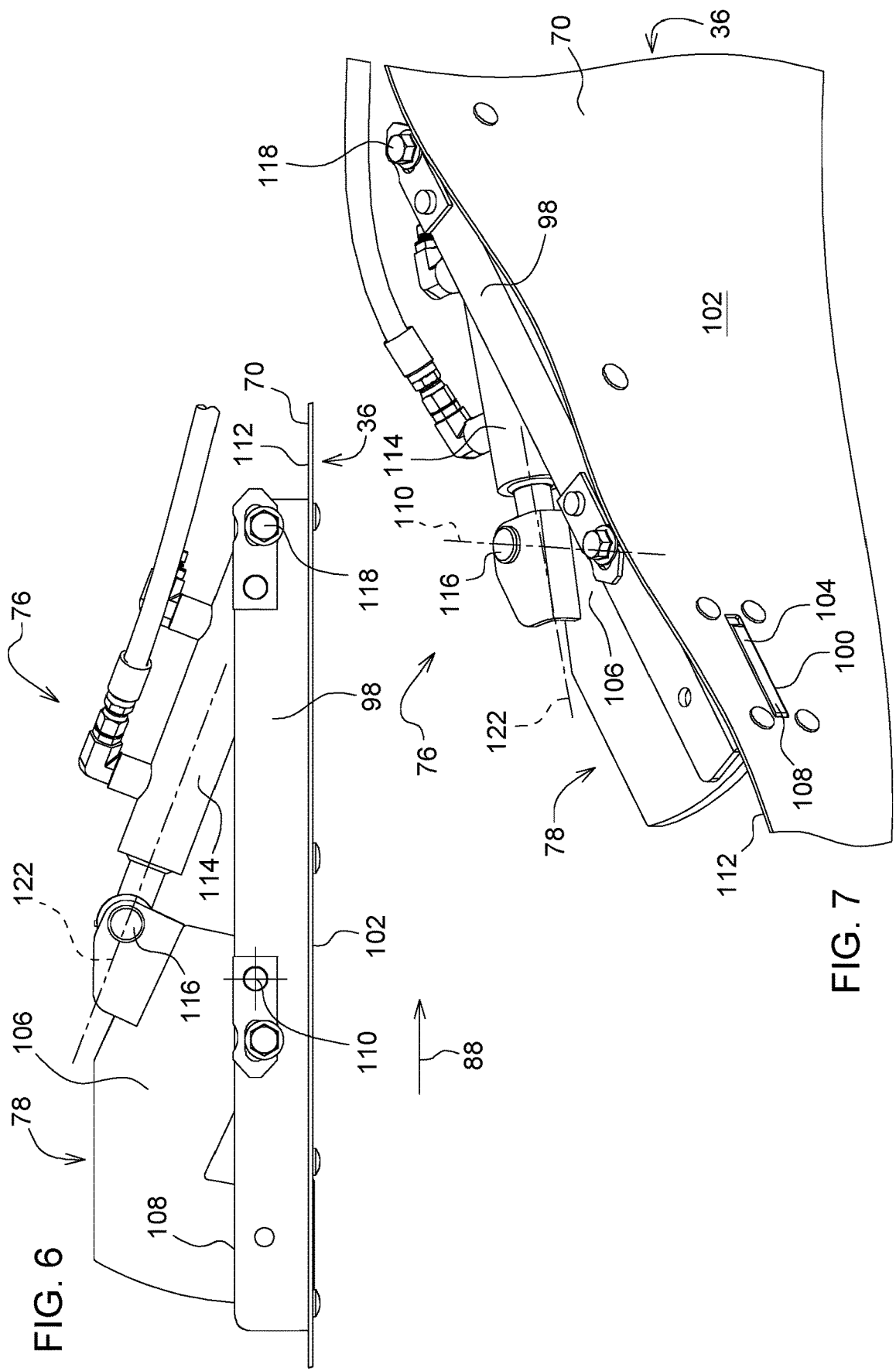

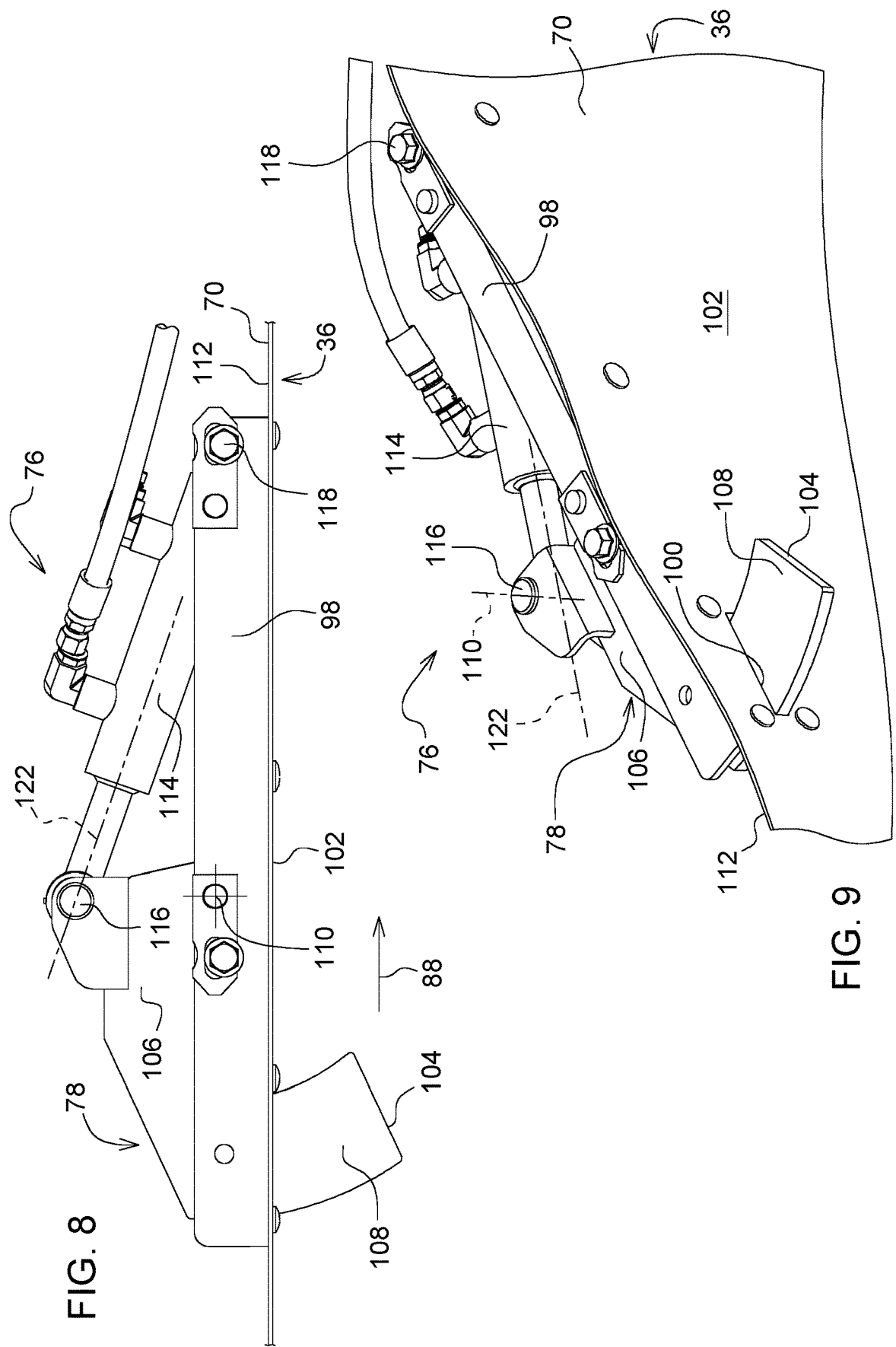

ROUND BALER WITH BALE HOLDER IN GATE

TECHNICAL FIELD

The disclosure generally relates to a round baler for forming a bale of a material into a cylindrical shape.

BACKGROUND

There are a wide variety of different types of agricultural machines that generate bales of agricultural material that has been harvested. Such balers can bale material like hay, straw, silage, etc.

It is not uncommon for operators to wish to know the weight of each bale. There are a variety of different reasons for this. For instance, the weight of the bale may be indicative of the moisture level of the baled material. The operator may wish to know this so that he or she can regulate the baling process based on the moisture content in a bale. Similarly, bales are often moved away from a field where they are harvested by loading them onto a transport vehicle. The transport vehicles are often rated to carry only a certain weight. Thus, knowing the weight of the bale can help in ensuring that the rated transport vehicle load is not exceeded. Further, bales may be sold based on weight.

In order to address this issue, some current systems have been implemented in round balers. Some current systems use a wheel or spindle load measurement device which measures the load exerted on the wheel or spindle of the round baler. However, these systems can be expensive and inaccurate. It is not uncommon for the round baler, itself, to weigh several times as much as the bale that it is making. Therefore, even if the measurement device has a relatively low error, this can still result in a relatively high error in the bale weight measurement, because the load measuring device is also measuring the entire weight of the baler. Other systems may attempt to weigh the bale with the bale secured to a rear gate of the round baler, and with the rear gate partially opened.

The discussion above is merely provided for general background information and is not intended to be used as an aid in determining the scope of the claimed subject matter.

SUMMARY

A round baler is provided. The round baler includes a housing, and a gate rotatably attached to the housing for rotation about a gate rotation axis. The gate if moveable between a closed position, an open position, and at least one intermediate position disposed between the closed position and the open position. The housing and the gate cooperate to define an interior region. A bale formation system is disposed within the interior region. The bale formation system is operable to form a bale having a circular cylindrical shape. The cylindrical shape of the bale includes a first circular end face and a second circular end face disposed at opposing ends of the bale relative to a centerline of the cylindrical shape. The centerline of the cylindrical shape is generally parallel with the gate rotation axis during formation of the bale by the bale formation system. A bale holder is attached to and moveable with the gate. The bale holder includes a retractable member that is moveable between an engaged position operable to grasp the bale and move the bale with the gate, and a disengaged position operable to release the bale relative to the gate.

In one aspect of the disclosure, the retractable member is positioned to grasp the first circular end face of the bale within the interior region at a contact location. The contact location is disposed rearward of a vertical reference plane passing through the centerline of the bale when the bale is disposed within the interior region and the gate is disposed in the closed position. The vertical reference plane is arranged perpendicular to the first circular end face and the second circular end face of the bale. In another aspect of the disclosure, the contact location may be disposed below a horizontal plane passing through the centerline of the bale when the bale is disposed within the interior region and the gate is disposed in the closed position.

In one aspect of the disclosure, a lower roller is attached to and supported by the gate at a forward lowermost edge of the gate. The lower roller extends across a width of the interior region. The contact location is positioned such that a gravitational force acting on the bale urges the bale into engagement with the lower roller when the gate is disposed in the intermediate position, so that the bale is supported by the bale holder and the lower roller when the gate is disposed in the intermediate position. By engaging the bale with the bale holder at the contact location, which is located rearward of the centerline, gravity may be used to cause the bale to rotate forward and downward onto the lower roller, thereby ensuring a consistent location of the bale relative to the gate when in the intermediate position. Having the bale in a consistent location relative to the gate allows the weight of the bale to be calculated accurately based on the forces acting on the gate.

In one aspect of the disclosure, the retractable member may be moveable relative to the gate based on a diameter of the bale to change the position of the contact location when the gate is disposed in the closed position. By relocating the retractable member, the bale holder may be positioned to engage bales of different diameters, while ensuring that the bales consistently settle into the desired position on the lower roller.

In one aspect of the disclosure, the contact location may be spaced away from a circumferential edge of the first circular end face by an edge distance. The edge distance is equal to or greater than a value that is approximately ten percent of a diameter of the bale.

In one aspect of the disclosure, the gate includes a first side wall that is positioned generally parallel with the first circular end face of the bale during formation of the bale in the bale formation system. The bale holder is positioned against the first side wall. The bale holder includes a support member. The first side wall defines an opening, with the retractable member moveable within and through the opening.

In one aspect of the disclosure, the retractable member includes a shape that is complimentary to a shape of the opening. The retractable member substantially fills the opening when the retractable member is disposed in the engaged position and the disengaged position.

In one aspect of the disclosure, the gate holder includes an actuator that interconnects the retractable member and the gate. The actuator is operable to move the retractable member between the engaged position and the disengaged position. In one implementation, the actuator includes a linear actuator operable to extend and retract along a linear path. For example, the actuator may include a hydraulic cylinder, an electrically actuated linear actuator, a pneumatic cylinder, or some other similar device.

In one implementation, the retractable member is rotatable relative to the first side wall about a holder rotation axis.

The actuator includes a first end pivotably attached to the retractable member at a location spaced form the holder rotation axis. The actuator includes a second end attached to a fixed structure other than the retractable member, such as but not limited to the first side wall or the support member. Extension and retraction of the actuator rotates the retractable member about the holder rotation axis to move the retractable member between the engaged position and the disengaged position.

In one implementation, the retractable member includes a base portion and a tooth portion extending from the base portion. The tooth portion is positioned at a location spaced from the holder rotation axis, with the first end of the actuator coupled to the base portion. The tooth portion is moveable within and through the opening of the first side wall to engage or disengage the bale as the retractable member moves between the engaged position and the disengaged position.

In one aspect of the disclosure, the base portion of the retractable member is positioned adjacent an exterior surface of the first side wall. the tooth portion includes an end surface that is positioned substantially flush with an interior surface of the first side wall when the retractable member is disposed in the disengaged position. As such, the end surface of the tooth portion and the interior surface of the first side wall present a substantially flat and solid surface so that crop material is not caught in the opening and/or gathered around the tooth portion.

In one implementation of the round baler, the retractable member includes a latch portion. The latch portion is moveable between a latched position and an un-latched position. The latch portion is disposed in the latched position when the retractable member is disposed in the engaged position. The latch portion is positioned in the latched position to secure the gate relative to the first side wall. In one implementation the latch portion includes a hook operable to grasp the first side wall in interlocking engagement when positioned in the latched position. The latch portion is disposed in the un-latched position when the retractable member is disposed in the disengaged position to allow movement of the gate relative to the first side wall. Accordingly, as the retractable member moves from the disengaged position into the engaged position, the latch portion of the retractable member simultaneously moves from the lathed position into the un-latched position to allow movement of the gate relative to the frame. Similarly, as the retractable member moves from the engaged position into the disengaged position, the latch portion of the retractable member simultaneously moves from the un-latched position into the latched position to secure the gate relative to the frame.

In one implementation of the round baler, the retractable member is rotatable about a holder rotation axis. The latch portion is disposed forward of the holder rotation axis. The retractable member includes a base portion and a tooth portion extending from the base portion at a location spaced from the holder rotation axis. The tooth portion is disposed rearward of the holder rotation axis.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 6 is a schematic fragmentary cross-sectional view of the round baler showing a retractable member of the bale holder in a disengaged position.

FIG. 7 is a schematic fragmentary interior perspective view of the round baler showing the retractable member in the disengaged position.

FIG. 8 is a schematic fragmentary cross-sectional view of the round baler showing the retractable member of the bale holder in an engaged position.

FIG. 9 is a schematic fragmentary interior perspective view of the round baler showing the retractable member in the engaged position.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
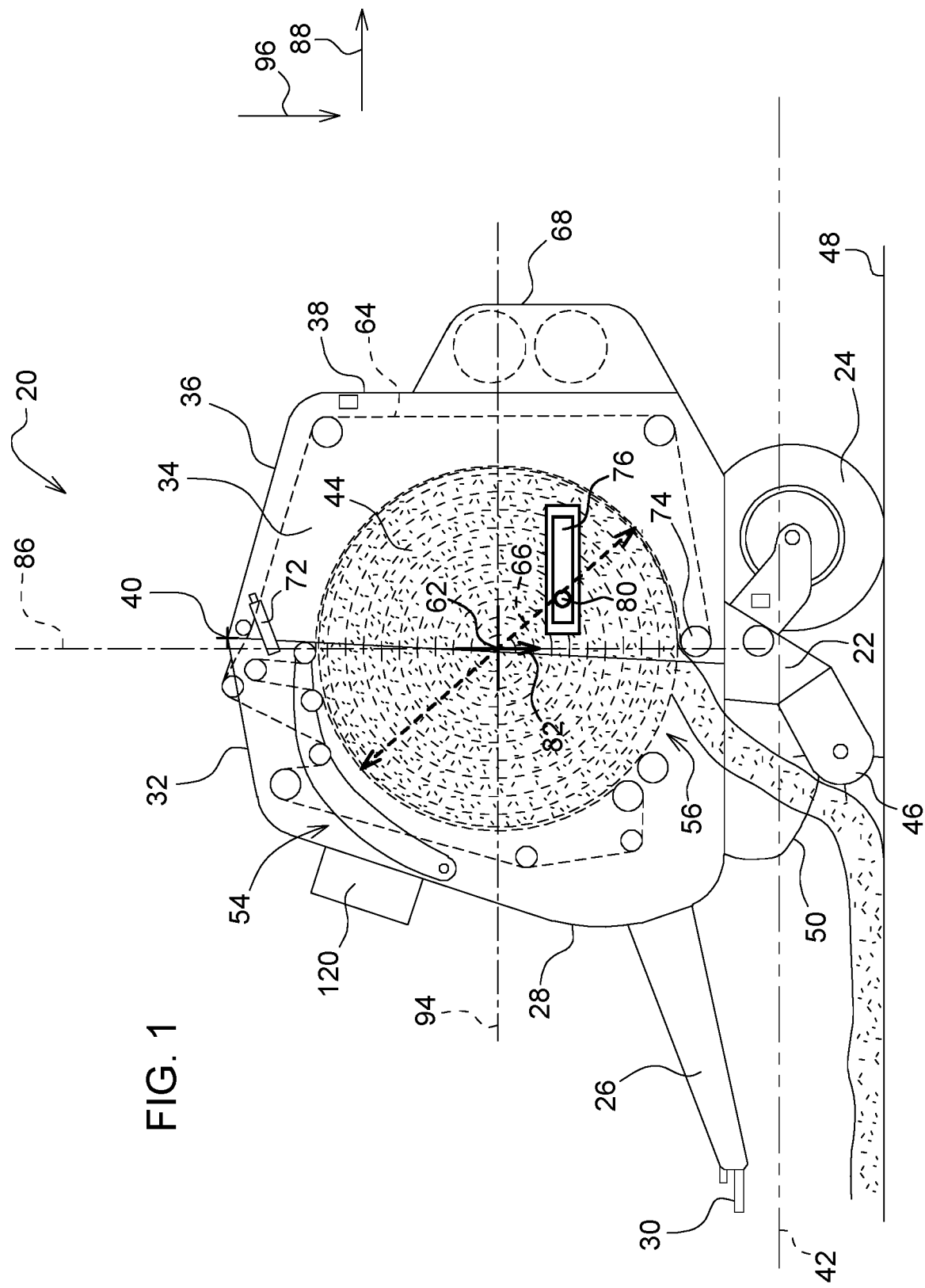
FIG. 1 is a schematic side view of a round baler showing a gate in a closed position.
Figure 2:
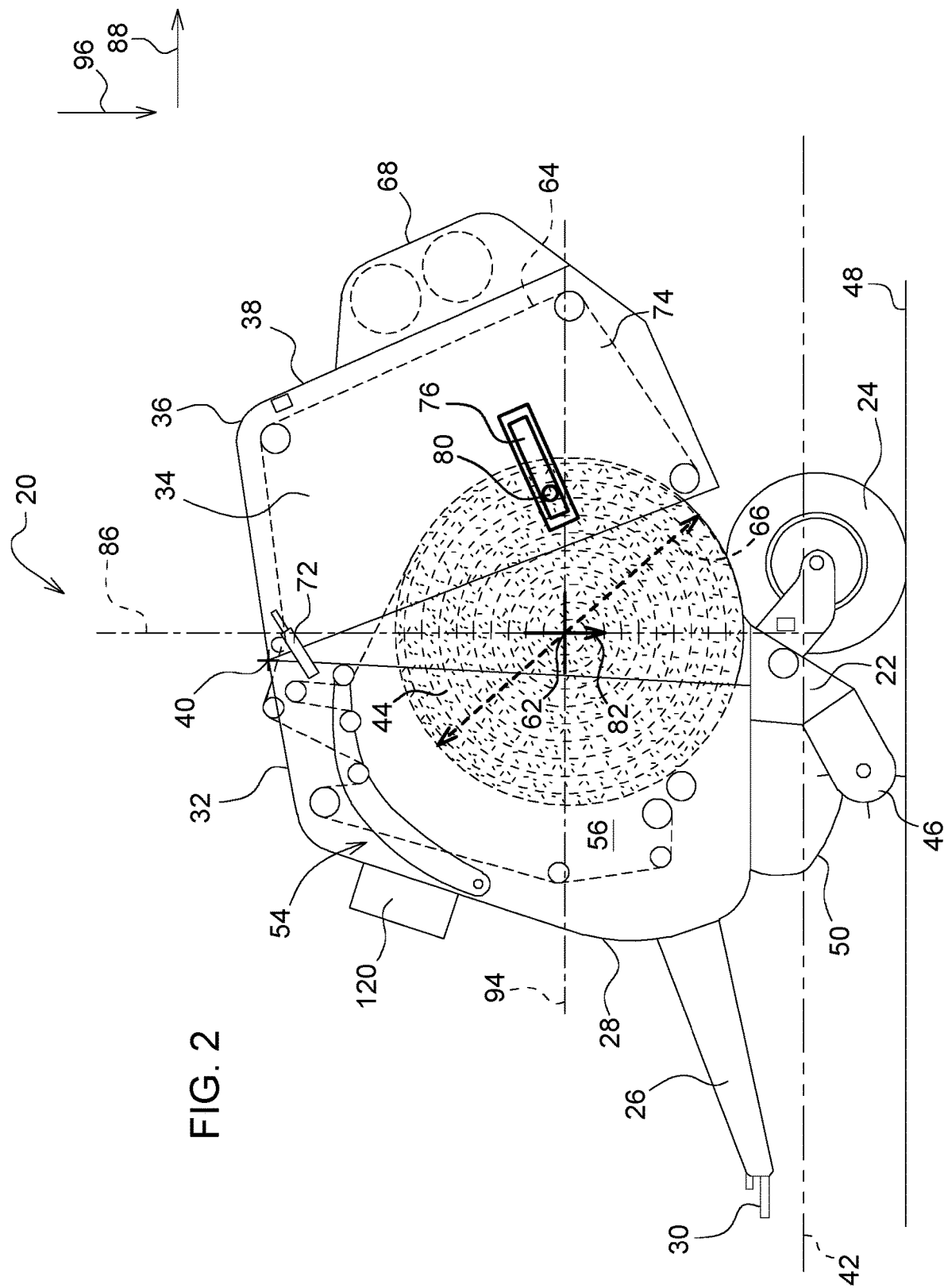
FIG. 2 is a schematic side view of the round baler showing the gate in an intermediate position.
Figure 3:
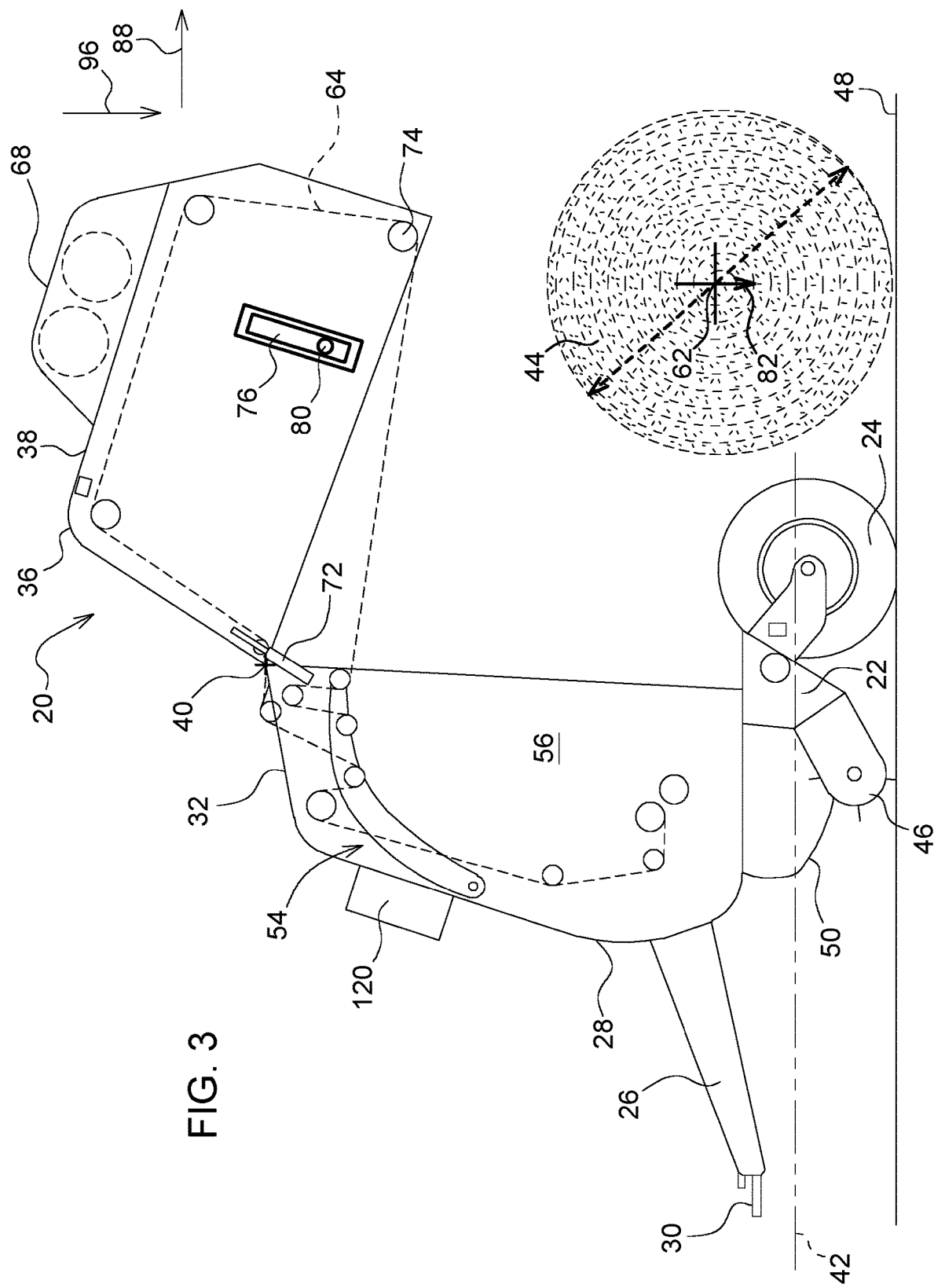
FIG. 3 is a schematic side view of the round baler showing the gate in an open position.

Referring to the Figures, wherein like numerals indicate like parts throughout the several views, a round baler is generally shown at 20. Referring to FIGS. 1-3, the round baler 20 includes a frame 22. One or more ground engaging elements 24, such as but not limited to one or more wheels and/or tracks, are attached to and rotatably supported by the frame 22. A tongue 26 may be coupled to the frame 22 at a forward end 28 of the frame 22. A hitch arrangement 30 may be included with the tongue 26. The hitch arrangement 30 may be used to attach the round baler 20 to a traction unit, such as but not limited to an agricultural tractor. In other embodiments, the round baler 20 may be self-propelled, in which case the traction unit and the round baler 20 are configured as a single, self-propelled vehicle.

The round baler 20 includes a housing 32. The housing 32 is attached to and supported by the frame 22. The housing 32 may include one or more walls or panels that at least partially enclose and/or define an interior region 34. The round baler 20 further includes a gate 36. The gate 36 may include one or more walls or panels that at least partially enclose and/or define the interior region 34. As such, the housing 32 and the gate 36 cooperate to define the interior region 34 therebetween.

The gate 36 is attached to and rotatably supported by the housing 32. The gate 36 is positioned adjacent a rearward end 38 of the frame 22 and is pivotably moveable about a gate rotation axis 40. The gate rotation axis 40 is generally horizontal and perpendicular to a central longitudinal axis 42 of the frame 22. The gate 36 is moveable between a closed position (shown in FIG. 1) for forming a bale 44 within the interior region 34, and an open position (shown in FIG. 3) for discharging the bale 44 from the interior region 34. The gate 36 may further be moveable to at least one intermediate position (shown in FIG. 2), which is disposed between the closed position and the open position.

The round baler 20 includes a pick-up 46 disposed proximate the forward end 28 of the frame 22. The pickup gathers crop material from a ground surface 48 and directs the gathered crop material toward and into an inlet 50 of the interior region 34. The pickup may include, but is not limited to tines, forks, augers, conveyors, baffles, etc., for gathering and moving the crop material. The round baler 20 may be equipped with a pre-cutter (not shown), disposed between the pickup and the inlet 50. As such, the pre-cutter is disposed downstream of the pickup and upstream of the inlet 50 relative to a direction of travel of the crop material. As is understood by those skilled in the art, the pre-cutter cuts or chops the crop material into smaller pieces.

Figure 4:
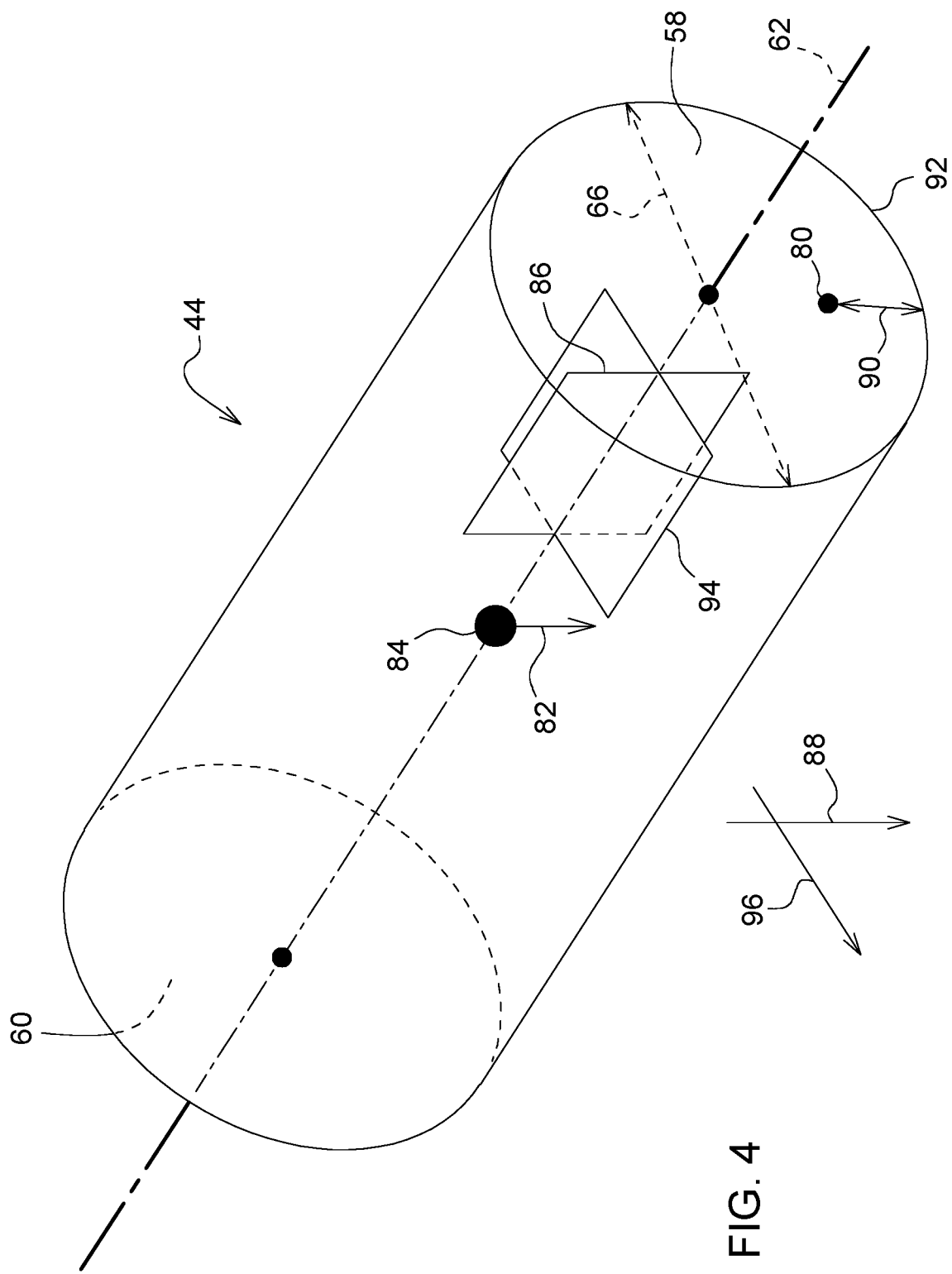
FIG. 4 is a schematic perspective view of a bale.

A bale formation system 54 is disposed within the interior region 34 and defines a baling chamber 56. The bale formation system 54 is operable to form the bale 44 to have a cylindrical shape. Referring to FIG. 4, the cylindrical shape of the bale 44 includes a first circular end face 58 and a second circular end face 60 disposed at opposing ends of the bale 44 relative to a centerline 62 of the cylindrical shape. The centerline 62 of the bale 44 is generally located and extends through respective diametric centers of the first circular end face 58 and the second circular end face 60. The centerline 62 of the cylindrical shape is generally parallel with the gate rotation axis 40 during formation of the bale 44 by the bale formation system 54, within the baling chamber 56.

The bale formation system 54 may be configured as a variable chamber baler, or as a fixed chamber baler. The round baler 20 shown in the Figures and described herein is depicted and described as a variable chamber baler. Referring to FIGS. 1-3, and as is understood by those skilled in the art, the variable chamber baler includes a plurality of longitudinally extending side-by-side forming belts 64 that are supported by a plurality of rollers. The bale 44 is formed by the forming belts 64 and one or more side walls of the housing 32. As is understood by those skilled in the art, the forming belts 64 are controlled to vary the radial size of the baling chamber 56. As understood by those skilled in the art, if the bale formation system 54 is configured as a fixed chamber baler, the round baler 20 may include a plurality of rollers rotatably attached to and supported by the housing 32 and the gate 36, and arranged in cross section to form a circular baling chamber 56 having a fixed diameter 66. The specific components and operation of the bale formation system 54, i.e., the variable chamber bale formation system 54 or the fixed chamber bale formation system 54, are known to those skilled in the art, are not pertinent to the teachings of this disclosure, and are therefore not described in detail herein.

In the example implementation shown in the figures and described herein, in which the bale formation system 54 includes the variable chamber baler, the crop material is directed through the inlet 50 and into the baling chamber 56, whereby the forming belts 64 roll the crop material in a spiral fashion into the bale 44 having the cylindrical shape. The belts apply a constant pressure to the crop material as the crop material is formed into the bale 44. A belt tensioner continuously moves the forming belts 64 radially outward relative to the centerline 62 of the cylindrical bale 44 as a diameter 66 of the bale 44 increases. The belt tensioner maintains the appropriate tension in the belts to obtain the desired density of the crop material.

As shown in FIGS. 1-3, the round baler 20 includes a wrap system 68. The wrap system 68 is operable to wrap the bale 44 with a wrap material inside the baling chamber 56. Once the bale 44 is formed to a desired size, the wrap system 68 feeds the wrap material into the baling chamber 56 to wrap the bale 44 and thereby secure the crop material in a tight package and maintain the desired shape of the bale 44. The wrap material may include, but is not limited to, a twine, a net mesh, or a solid plastic wrap. Movement of the gate 36 into the open position simultaneously moves the belts clear of the formed bale 44 and allows the formed and wrapped bale 44 to be discharged through the rear of the baling chamber 56.

Referring to FIG. 1, the gate 36 includes a first side wall 70 positioned generally parallel with the first circular end face 58 of the bale 44 during formation of the bale 44 in the bale formation system 54. A second side wall (not shown) is positioned generally parallel with the second circular end face 60 of the bale 44 during formation of the bale 44 in the bale formation system 54. It should be appreciated that the first circular end face 58 and the first side wall 70 may be positioned one either the left side or the right side of the round baler 20, relative to a direction of travel of the round baler 20 while gathering crop material, with the second circular end face 60 and the second side wall positioned on the other of the left side or the right side of the round baler 20, opposite the first circular end face 58 and the first side wall 70.

In some circumstances and/or for some baling operations, it is desirable to measure or otherwise determine a weight of the bale 44 after formation and before being discharged from the interior region 34 of the round baler 20 and onto the ground surface 48. One process of determining the weight of the bale 44 is to fully support the bale 44 on the gate 36, and measure the force applied to one or more hydraulic cylinders 72 holding the gate 36 and the bale 44. In order to do so, the bale 44 and the gate 36 may be moved to the intermediate position, such that the weight of the bale 44 is fully supported by the gate 36. Referring to FIG. 2, in the intermediate position, one or more pressure or force sensors may sense data related to the forces acting on the hydraulic cylinders 72 holding the gate 36 in the intermediate position. Knowing theses forces and the weight and geometry of the gate 36, the weight of the bale 44 may be accurately calculated. In order to accurately make this calculation, however, the bale 44 should be consistently positioned relative to the gate 36.

In order to consistently position the bale 44 relative to the gate 36, the bale 44 may be positioned relative to a specific feature of the gate 36. For example, the gate 36 may include multiple rollers attached thereto that are used to form the bale 44. One of the multiple rollers may be defined as a lower roller 74. The lower roller 74 is attached to and supported by the gate 36. While the gate 36 may include multiple rollers, the lower roller 74 is positioned at a forward lowermost edge of the gate 36, i.e., the lower edge of the gate 36 facing the housing 32. The lower roller 74 may extend across a width of the interior region 34. While the gate 36 may include multiple rollers, in the example implementation described herein, the lower roller 74 is the specific roller that is positioned closest to the lower edge of the gate 36 facing the housing 32. However, in other embodiments, the lower roller 74 may include a different relative position amongst the other multitude of rollers. As such, the word "lower" is used to identify or differentiate the lower roller 74 from other rollers of the rear gate 36, and should not be interpreted as limiting the lower roller 74 to only the lowermost roller of the gate 36. The bale 44 may be positioned relative to the lower roller 74, such that the lower roller 74 consistently supports the weight of the bale 44 in a consistent location relative to the gate 36, to enable the weight of the bale 44 to be accurately calculated.

Figure 5:
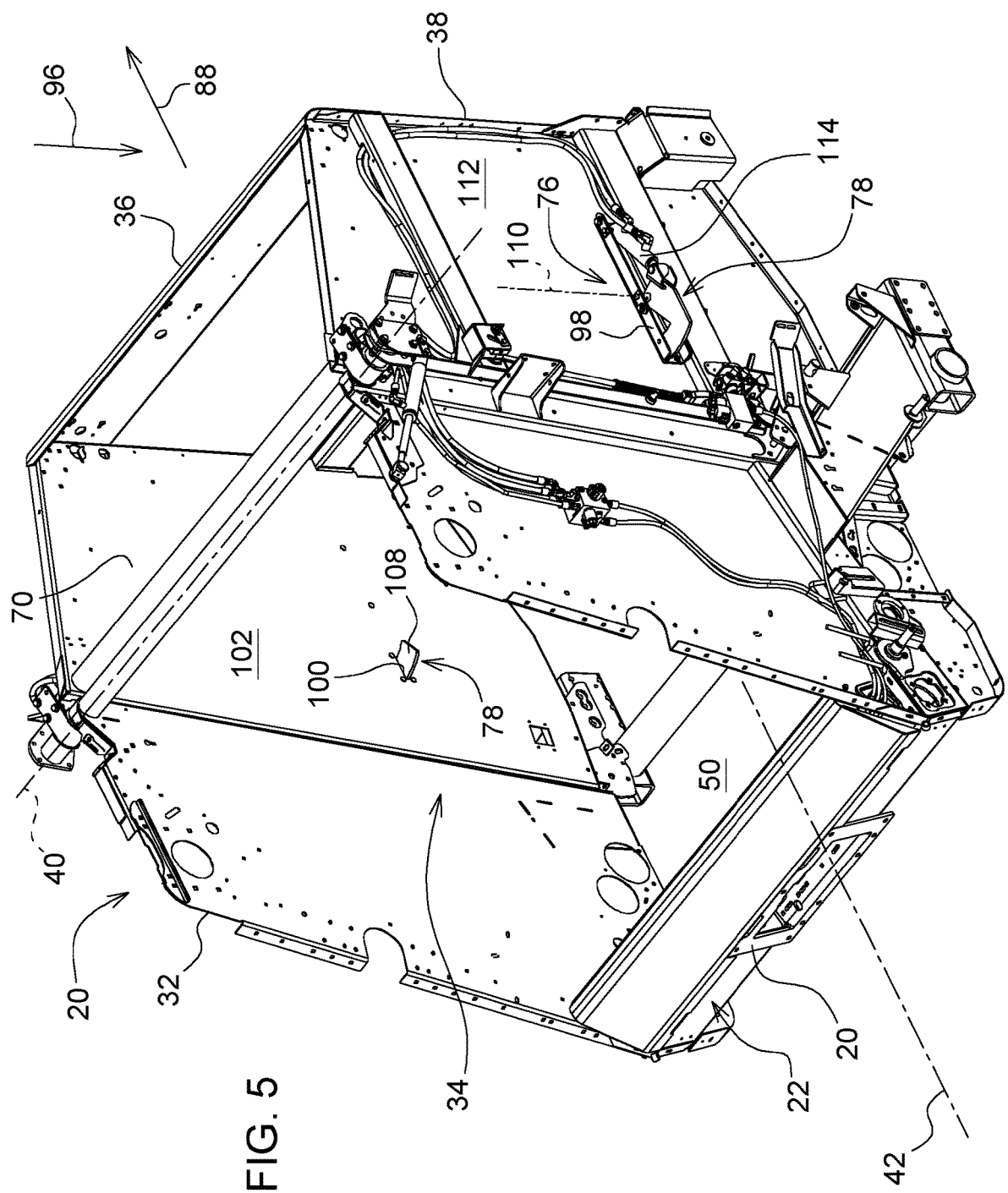
FIG. 5 is a schematic fragmentary exterior perspective view of the round baler showing a bale holder.

Referring to FIG. 5, the round baler 20 includes a bale holder 76. The bale holder 76 is attached to and moveable with the gate 36. In the example implementation shown in the figures and described herein, the bale holder 76 is positioned against the first side wall 70. However, it should be appreciated that the bale holder 76 may alternatively be positioned adjacent to the second side wall. Furthermore, while the detailed description describes a single bale holder 76 positioned adjacent the first side wall 70 for engaging the first circular end face 58 of the bale 44, it should be appreciated that a mirror copy of the bale holder 76 may be included adjacent the second side wall for engaging the second circular end face 60 of the bale 44.

Referring to FIGS. 6-12, the bale holder 76 includes a retractable member 78. The retractable member 78 is moveable between an engaged position and a disengaged position. When the retractable member 78 is disposed in the engaged position, the retractable member 78 is operable to grasp the bale 44 and move the bale 44 with the gate 36. When the retractable member 78 is disposed in the disengaged position, the retractable member 78 is operable to release the bale 44 relative to the gate 36.

Referring to FIGS. 2 and 4, the retractable member 78 is positioned relative to the bale 44 to grasp the first circular end face 58 of the bale 44 within the interior region 34 at a contact location 80 on the first circular end face 58. The contact location 80 is positioned such that a gravitational force 82 acting on a center of gravity 84 of the bale 44 urges the bale 44 into engagement with the lower roller 74 when the gate 36 is disposed in the intermediate position so that the bale 44 is supported by the bale holder 76 and the lower roller 74 when the gate 36 is disposed in the intermediate position. The position of the contact location 80 relative to the center of gravity 84 of the bale 44 causes the gravitational force 82 acting on the bale 44 to urge or rotate the bale 44 forward and downward relative to the direction of travel of the round baler 20 when gathering crop, so that the bale 44 rests on the lower roller 74. This positions the bale 44 in a consistent location when the gate 36 is in the intermediate position, so that the weight of the bale 44 may be calculated.

The contact location 80 is disposed rearward of a vertical reference plane 86. As used herein, the rearward direction is relative to the direction of travel of the round baler 20 when gathering crop material. The rearward direction is generally indicated by arrow 88. The vertical reference plane 86 is an imaginary plane or planar surface that passes through the centerline 62 of the bale 44 when the bale 44 is disposed within the interior region 34 and the gate 36 is disposed in the closed position. The vertical reference plane 86 is arranged and/or positioned perpendicular to the first circular end face 58 and the second circular end face 60 of the bale 44. It should be appreciated that the position of the contact location 80 relative to the gate 36 and the centerline 62 of the bale 44 changes as the gate 36 moves in an arcuate path from the closed position into the intermediate position.

In one implementation, the contact location 80 is disposed an edge distance 90 from a circumferential edge 92 of the first circular end face 58. The edge distance 90 may be defined to equal a distance capable of ensuring that the cylindrical structure of the bale 44 is not disrupted as the gate 36 moves the bale 44 from the closed position into the intermediate position. In one implementation, the edge distance 90 may be equal to or greater than a value that is approximately ten percent of the diameter 66 of the bale 44. As used herein, approximately equal to ten percent may be interpreted as being within plus or minus 5% of the value.

In one implementation, the contact location 80 may be disposed below a horizontal reference plane 94. As used herein, the horizontal reference plane 94 is positioned normal to the direction of gravity. The direction of gravity is generally indicated by arrow 96. The horizontal reference plane 94 is an imaginary plane or planar surface that passes through the centerline 62 of the bale 44 when the bale 44 is disposed within the interior region 34 and the gate 36 is disposed in the closed position. It should be appreciated that the position of the contact location 80 relative to the gate 36 and the centerline 62 of the bale 44 changes as the gate 36 moves in an arcuate path from the closed position into the intermediate position.

In one implementation, the bale holder 76 and/or the retractable member 78 may be moveable relative to the gate 36 to change the position of the contact location 80 when the gate 36 is disposed in the closed position. The position of the bale holder 76 and/or the retractable member 78 may be based on the diameter 66 of the bale 44. In some implementations, the round baler 20 may be re-configurable to form bale 44s of different diameters 66. In which case, it is contemplated that the bale holder 76 and/or the retractable member 78 may be re-positionable relative to the gate 36 to change the position of the contact location 80. In so doing, the contact location 80 may be customized for specific diameters 66. For example, the bale holder 76 may be moved to a first position on the first side wall 70 so that the retractable member 78 engages the bale 44 at a first contact location 80 specific to a first diameter 66, whereas the bale holder 76 may be moved to a second position on the first side wall 70 so that the retractable member 78 engages the bale 44 at a second contact location 80 specific to a second diameter 66.

Referring to FIGS. 6-9, a first embodiment of the bale holder is generally shown at 76. The bale holder 76 includes a support member 98. The support member 98 may be configured in a suitable manner for attachment to the gate 36. The support member 98 may include plates, channel members, tubular members, etc., configured to support the retractable member 78 and other components of the bale holder 76, and enable attachment to the gate 36. In the example implementation shown in the Figures, the support member 98 is attached to the first side wall 70. However, in other implementations, the support member 98 may be attached to other components of the gate 36 and positioned adjacent to the first side wall 70.

The first side wall 70 defines an opening 100. The retractable member 78 is positioned and moveable within the opening 100. The retractable member 78 includes a shape that is complimentary to a shape of the opening 100. As such, the retractable member 78 substantially fills the opening 100. As shown in FIGS. 6 and 7, the retractable member 78 includes an end surface 104 that is positioned substantially flush with an interior surface 102 of the first side wall 70 when the retractable member 78 is disposed in the disengaged position. Because the shape of the retractable member 78 compliments the shape of the opening 100, generally filling the opening 100, crop material is prevented from becoming caught and/or intertwined around the retractable member 78 when the retractable member 78 is disposed in the disengaged position. As shown in FIGS. 8 and 9, the end surface 104 is projected inward into the interior region 34 and into engagement with the first circular end face 58 of the bale 44 when the retractable member 78 is disposed in the engaged position.

Referring to FIG. 7, the opening 100 in the first side wall 70 has a generally rectangular shape. The retractable member 78 includes a generally planar structure having a base portion 106 and a tooth portion 108. The tooth portion 108 of the retractable member 78 is disposed within the opening 100 of the first side wall 70. The tooth portion 108 includes a generally rectangular shape complimentary in size to that of the opening 100, such that the tooth portion 108 generally fills the opening 100 in the first side wall 70. The tooth portion 108 includes or defines the end surface 104, along an edge of the plate. As shown in FIG. 7, the end surface 104 of the tooth portion 108 is positioned flush with the interior surface 102 of the first side wall 70 when the retractable member 78 is disposed in the engaged position. As shown in FIGS. 8 and 9, the tooth portion 108 and the end surface 104 thereof are pressed inward into the interior region 34, beyond the interior surface 102 of the first side wall 70, into engagement with the bale 44.

Referring to FIGS. 6 and 8, the retractable member 78 is rotatable relative to the first side wall 70 about a holder rotation axis 110. In one implementation, the retractable member 78 is rotatably attached to the support member 98 for rotation about the holder rotation axis 110. The holder rotation axis 110 is arranged in a generally vertical orientation, such that the retractable member 78 generally moves on a horizontal plane.

The tooth portion 108 of the retractable member 78 extends away from the base portion 106 at a location that is spaced from the holder rotation axis 110. The base portion 106 of the retractable member 78 is positioned adjacent to an exterior surface 112 of the first side wall 70, with the tooth portion 108 extending through the opening 100. Rotation of the base portion 106 about the holder rotation axis 110 causes the tooth portion 108 to move toward and away from the interior region 34 of the round baler 20.

The gate 36 holder includes an actuator 114. The actuator 114 interconnects the retractable member 78 and the gate 36. In one implementation, the actuator 114 includes a linear actuator 114 that is operable to extend and retract along a linear path 122. The linear actuator 114 may include, but is not limited to, a hydraulic cylinder, and electric linear actuator, a pneumatic actuator, etc. The actuator 114 includes a first end 116 pivotably coupled to the base portion 106 of the retractable member 78 at a location spaced from the holder rotation axis 110. A second end 118 of the actuator 114 is coupled or attached to the gate 36. For example, the second end 118 of the actuator 114 may be attached to the support member 98, the first side wall 70, or some other structure of the gate 36. The actuator 114 extends and retracts to move the retractable member 78 between the engaged position and the disengaged position.

During operation, when the formation of the bale 44 within the bale formation system 54 is complete, such as shown in FIG. 1, the actuator 114 is signaled by a controller 120 to move the retractable member 78 from the disengaged position, shown in FIGS. 6 and 7, into the engaged position, shown in FIGS. 8 and 9. In response to the signal, the actuator 114 extends. Due to the offset between the holder rotation axis 110 and the connection between the first end 116 of the actuator 114 and the base portion 106 of the retractable member 78, extension of the actuator 114 causes the retractable member 78 to rotate about the holder rotation axis 110. This rotation of the base portion 106 moves the tooth portion 108 from the disengaged position, in which the end surface 104 of the tooth portion 108 is positioned flush against the interior surface 102 of the first side wall 70, into the engaged position, in which the tooth portion 108 protrudes into the interior region 34 and into penetrating engagement with the first circular end face 58 of the bale 44. It should be appreciated that a second bale holder 76 may be deployed on the opposing end of the bale 44 to similarly operate and engage the second circular end face 60 of the bale 44.

Once the tooth portion 108 is positioned in the engaged position, in which the tooth portion 108 is disposed in penetrating engagement with the bale 44 at the contact location 80, the gate 36 may be controlled to move from the closed position into the intermediate position, shown in FIG. 2. Due to the grasping engagement of the bale holder 76 with the bale 44, the bale 44 moves with the gate 36 into the intermediate position. Because of the position of the contact location 80, where the tooth portion 108 penetrates into the bale 44, gravity acts on the bale 44 causing the bale 44 to rotate forward and/or downward until the bale 44 rests upon the lower roller 74. Once positioned on the lower roller 74, the weight of the bale 44 may be calculated. Because of the position of the contact location 80, and the resulting movement of the bale 44 onto the lower roller 74, the bale 44 is consistently positioned on the lower roller 74 to provide consistent and accurate measurements of the forces acting on the gate 36, which enables consistent and accurate determination of the weight of the bale 44.

Once the bale 44 weighing process is complete, the controller 120 may signal the actuator 114 to move the retractable member 78 into the disengaged position, shown in FIGS. 6 and 7. In response to the signal, the actuator 114 may retract, thereby causing the base portion 106 of the retractable member 78 to rotate about the holder rotation axis 110 and the tooth portion 108 of the retractable member 78 to withdraw from the bale 44. Because the shape of the tooth portion 108 compliments the shape of the opening 100 in the first side wall 70, any debris caught on the tooth portion 108 is scraped off as the tooth portion 108 is withdrawn from the interior region 34 through the first side wall 70. Furthermore, with the end surface 104 of the tooth portion 108 positioned flush against the interior surface 102 of the first side wall 70, there are not portions of the bale holder 76 to interfere with removal of the bale 44 from the interior region 34. Once the tooth portion 108 of the retractable member 78 is withdrawn from the bale 44, the bale 44 is free to fall out of the gate 36 as the gate 36 is moved into the open position, shown in FIG. 3.

Figure 10:
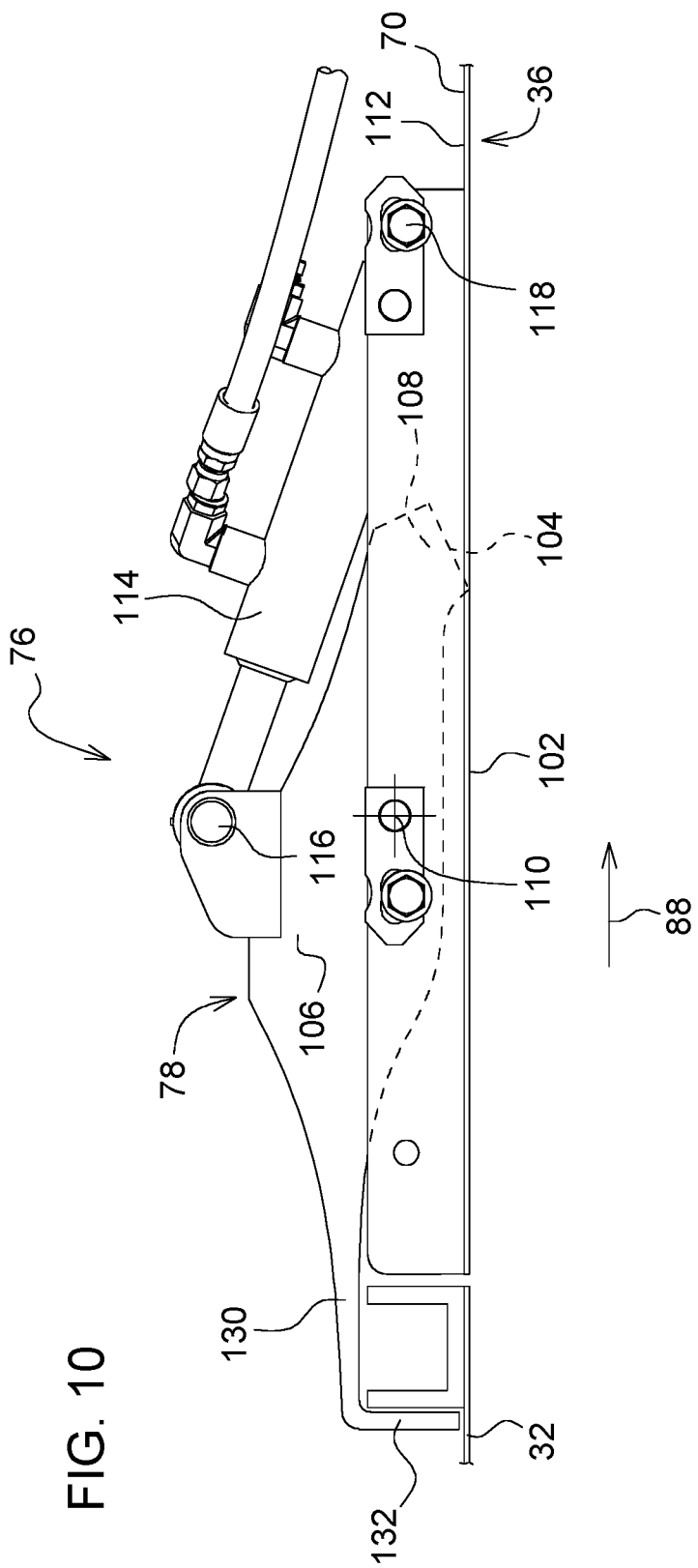
FIG. 10 is a schematic fragmentary cross sectional view of the round baler showing an alternative embodiment of the retractable member of FIGS. 6-9 with a latch portion in a latched position.
Figure 11:
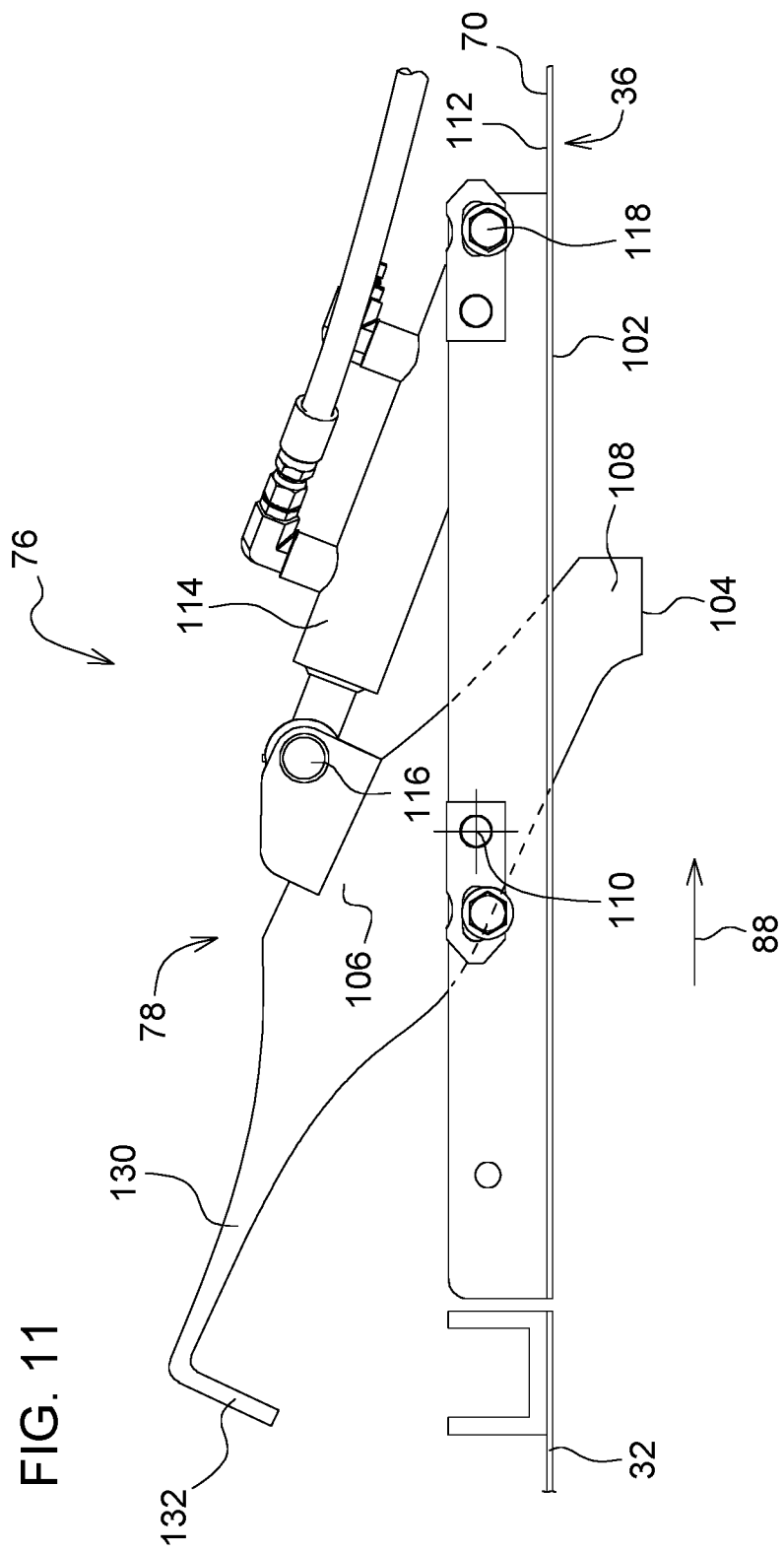
FIG. 11. is a schematic fragmentary cross sectional view of the round baler showing the alternative embodiment of the retractable member of FIGS. 6-9 with the latch portion in a un-latched position.

Referring to FIGS. 10 and 11, an alternative embodiment of the retractable member 78 shown in FIGS. 6-9 is shown. The retractable member 78 of FIGS. 10 and 11 includes a latch portion 130. The latch portion 130 is moveable between a latched position, shown in FIG. 10 and an un-latched position, shown in FIG. 11. The latch portion 130 is disposed in the latched position when the retractable member 78 is disposed in the engaged position. The latch portion 130 is positioned in the latched position to secure the gate 36 relative to the first side wall 70. In one implementation the latch portion 130 includes a hook 132 operable to grasp the first side wall 70 in interlocking engagement when positioned in the latched position. The latch portion 130 is disposed in the un-latched position when the retractable member 78 is disposed in the disengaged position to allow movement of the gate 36 relative to the first side wall 70. Accordingly, as the retractable member 78 moves from the disengaged position into the engaged position, the latch portion 130 of the retractable member 78 simultaneously moves from the latched position into the un-latched position to allow movement of the gate 36 relative to the frame 22. Similarly, as the retractable member 78 moves from the engaged position into the disengaged position, the latch portion 130 of the retractable member 78 simultaneously moves from the un-latched position into the latched position to secure the gate 36 relative to the frame 22.

The latch portion 130 is disposed forward of the holder rotation axis 110 relative to the direction of travel of the round baler 20 while gathering crop material, while the tooth portion 108 is disposed rearward of the holder rotation axis 110 relative to the direction of travel of the round baler 20 while gathering crop material.

Figure 12:
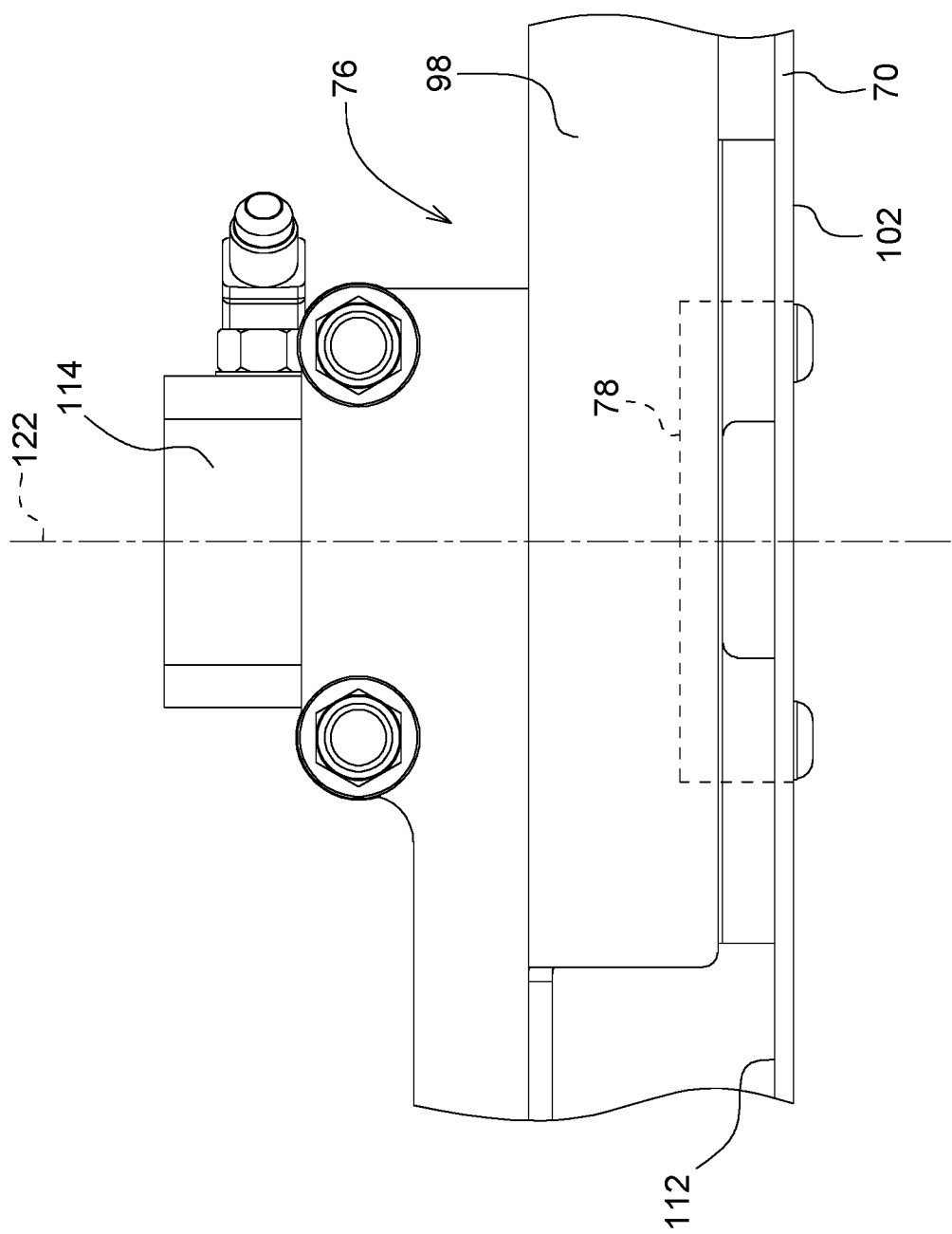
FIG. 12 is a schematic fragmentary cross-sectional view of the round baler showing an alternative embodiment of the retractable member in the disengaged position.
Figure 14:
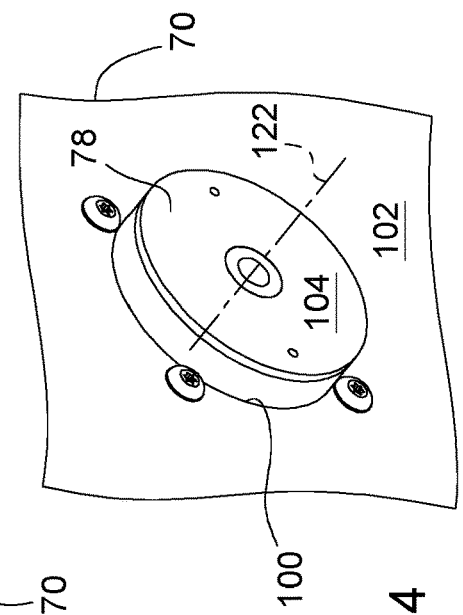
FIG. 14 is a schematic fragmentary interior perspective view of the round baler showing the alternative embodiment of the retractable member in the engaged position.
Figure 13:
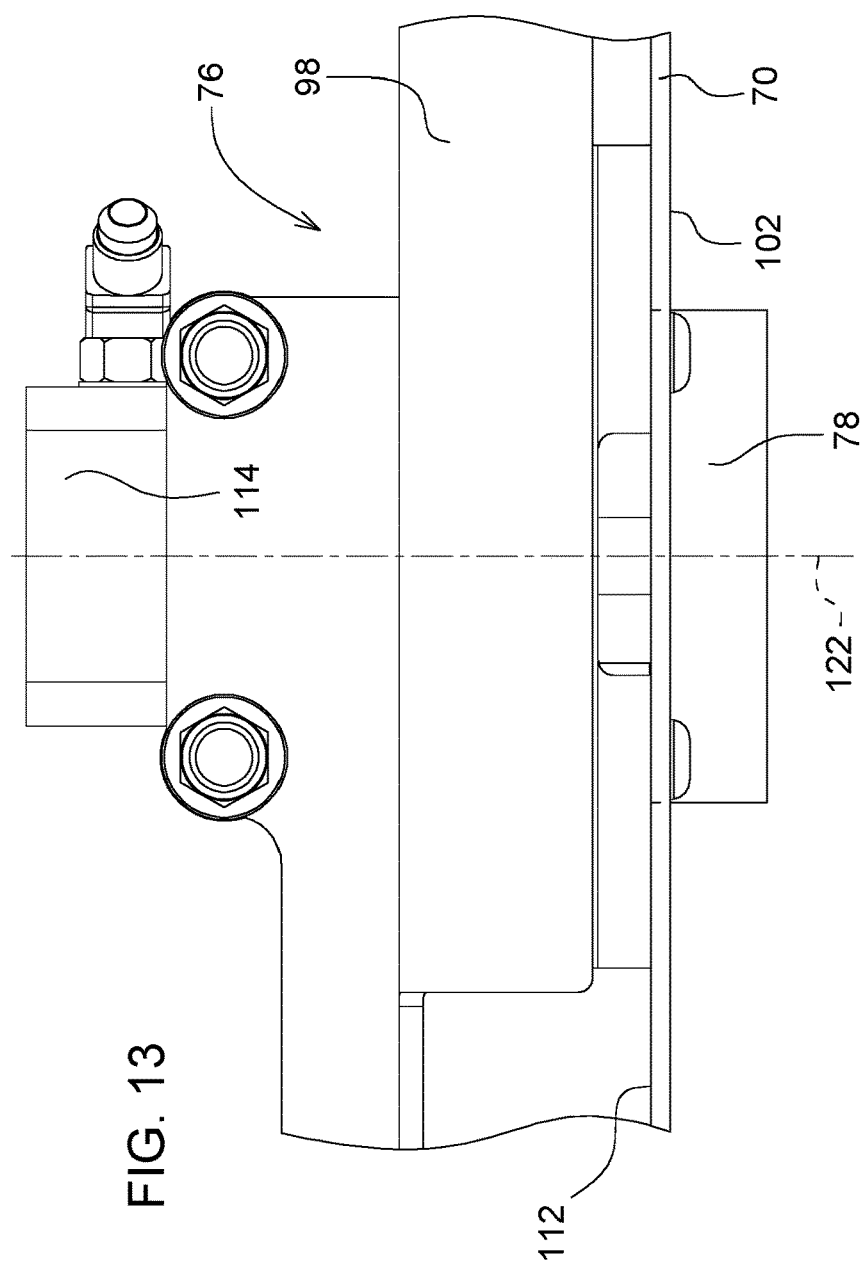
FIG. 13 is a schematic fragmentary cross-sectional view of the round baler showing the alternative embodiment of the retractable member in the engaged position.

Referring to FIGS. 12-14, a second embodiment of the bale holder is shown at 76. The bale holder 76 includes the linear actuator 114 that moves the retractable member 78 along the linear path 122. The actuator 114 is extendable and retractable to move the retractable member 78 between the engaged position, shown in FIGS. 13 and 14, and the disengaged position, shown in FIG. 12. The retractable member 78 includes a generally cylindrical shape defining the end surface 104. However, it should be appreciated that the retractable member 78 may exhibit other shapes. It should be appreciated that the opening 100 defines a complimentary circular shape in the first side wall 70. The retractable member 78 includes the end surface 104 that is positioned flush with the interior surface 102 of the first side wall 70 when the retractable member 78 is disposed in the engaged position.

In response to a signal from the controller 120, the actuator 114 extends along the linear path 122, pressing the retractable member 78 linearly along the linear path 122 into the interior region 34, into penetrating engagement with the bale 44. In response to another signal from the controller 120, the actuator 114 retracts along the linear path 122, withdrawing the retractable member 78 along the linear path 122 from the penetrating engagement with the bale 44.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A round baler comprising:
   a housing;
   a gate rotatably attached to the housing about a gate rotation axis for movement between a closed position, an open position, and at least one intermediate position disposed between the closed position and the open position;
   wherein the housing and the gate cooperate to define an interior region;
   a bale formation system disposed within the interior region and operable to form a bale having a circular cylindrical shape having a first circular end face and a second circular end face disposed at opposing ends of the bale relative to a centerline of the cylindrical shape, with the centerline of the cylindrical shape generally parallel with the gate rotation axis during formation of the bale by the bale formation system;
   a bale holder attached to and moveable with the gate, the bale holder including a retractable member moveable between an engaged position operable to grasp the bale and move the bale with the gate, and a disengaged position operable to release the bale relative to the gate;
   wherein the retractable member is positioned to grasp the first circular end face of the bale within the interior region at a contact location, with the contact location disposed rearward of a vertical reference plane passing through the centerline of the bale when the bale is disposed within the interior region and the gate is disposed in the closed position;
   wherein the gate includes a first side wall positioned generally parallel with the first circular end face of the bale during formation of the bale in the bale formation system, with the bale holder positioned against the first side wall; and
   wherein the retractable member includes a latch portion disposed in a latched position when the retractable member is disposed in the engaged position to secure the gate relative to the first side wall, and wherein the latch portion is disposed in an un-latched position when the retractable member is disposed in the disengaged position to allow movement of the gate relative to the first side wall.

2. The round baler set forth in claim 1, further comprising a lower roller attached to and supported by the gate at a forward lowermost edge of the gate, and extending across a width of the interior region.

3. The round baler set forth in claim 2, wherein the contact location is positioned such that a gravitational force acting on the bale urges the bale into engagement with the lower roller when the gate is disposed in the intermediate position so that the bale is supported by the bale holder and the lower roller when the gate is disposed in the intermediate position.

4. The round baler set forth in claim 1, wherein the contact location is disposed an edge distance from a circumferential edge of the first circular end face, with the edge distance equal to or greater than a value that is approximately ten percent of a diameter of the bale.

5. The round baler set forth in claim 1, wherein the contact location is disposed below a horizontal plane passing through the centerline of the bale when the bale is disposed within the interior region and the gate is disposed in the closed position.

6. The round baler set forth in claim 1, wherein the bale holder includes a support member.

7. The round baler set forth in claim 6, wherein the first side wall defines an opening, and wherein the retractable member is moveable within the opening.

8. The round baler set forth in claim 7, wherein the retractable member includes a shape complimentary to a shape of the opening, such that the retractable member substantially fills the opening when the retractable member is disposed in the engaged position and the disengaged position.

9. The round baler set forth in claim 6, wherein the bale holder includes an actuator interconnecting the retractable member and the gate, and operable to move the retractable member between the engaged position and the disengaged position.

10. The round baler set forth in claim 9, wherein the actuator includes a linear actuator operable to extend and retract along a linear path.

11. The round baler set forth in claim 10, wherein the retractable member is rotatable relative to the first side wall about a holder rotation axis.

12. The round baler set forth in claim 11, wherein the actuator includes a first end pivotably attached to the retractable member at a location spaced from the holder rotation axis.

13. The round baler set forth in claim 12, wherein the retractable member includes a base portion and a tooth portion extending from the base portion at a location spaced from the holder rotation axis, with the first end of the actuator coupled to the base portion.

14. The round baler set forth in claim 13, wherein the tooth portion includes an end surface positioned substantially flush with an interior surface of the first side wall when the retractable member is disposed in the disengaged position.

15. The round baler set forth in claim 14, wherein the base portion of the retractable member is positioned adjacent an exterior surface of the first side wall.

16. The round baler set forth in claim 1, wherein the retractable member is rotatable about a holder rotation axis, and wherein the latch portion is disposed forward of the holder rotation axis.

17. The round baler set forth in claim 1, wherein the retractable member includes a base portion and a tooth portion extending from the base portion at a location spaced from the holder rotation axis, with the tooth portion disposed rearward of the holder rotation axis.

18. The round baler set forth in claim 1, wherein the latch portion includes a hook operable to grasp the first side wall in interlocking engagement.

19. A round baler comprising:
a housing;
a gate rotatably attached to the housing about a gate rotation axis for movement between a closed position, an open position, and at least one intermediate position disposed between the closed position and the open position;
wherein the housing and the gate cooperate to define an interior region;
a bale formation system disposed within the interior region and operable to form a bale having a circular cylindrical shape having a first circular end face and a second circular end face disposed at opposing ends of the bale relative to a centerline of the cylindrical shape, with the centerline of the cylindrical shape generally parallel with the gate rotation axis during formation of the bale by the bale formation system;
a bale holder attached to and moveable with the gate, the bale holder including a retractable member moveable between an engaged position operable to grasp the bale and move the bale with the gate, and a disengaged position operable to release the bale relative to the gate;
wherein the gate includes a first side wall positioned generally parallel with the first circular end face of the bale during formation of the bale in the bale formation system, with the bale holder positioned against the first side wall;
wherein the first side wall defines an opening, and wherein the retractable member is moveable through the opening in a direction substantially perpendicular to the first side wall when moving between the engaged position and the disengaged position;
wherein the retractable member includes a shape complimentary to a shape of the opening, such that the retractable member substantially fills the opening when the retractable member is disposed in both the engaged position and the disengaged position; and
wherein the retractable member includes a latch portion disposed in a latched position when the retractable member is disposed in the engaged position to secure the gate relative to the first side wall, and wherein the latch portion is disposed in an un-latched position when the retractable member is disposed in the disengaged position to allow movement of the gate relative to the first side wall.

20. The round baler set forth in claim 19, wherein the bale holder includes an actuator interconnecting the retractable member and the gate, and operable to move the retractable member between the engaged position and the disengaged position.

21. The round baler set forth in claim 20, wherein the actuator includes a linear actuator operable to extend and retract along a linear path.

22. The round baler set forth in claim 20, wherein the retractable member is rotatable relative to the first side wall about a holder rotation axis.

23. The round baler set forth in claim 22, wherein the actuator includes a first end pivotably attached to the retractable member at a location spaced from the holder rotation axis.

24. The round baler set forth in claim 23, wherein the retractable member includes a base portion and a tooth portion extending from the base portion at a location spaced from the holder rotation axis, with the first end of the actuator coupled to the base portion.

25. The round baler set forth in claim 24, wherein the tooth portion includes an end surface positioned substantially flush with an interior surface of the first side wall when the retractable member is disposed in the disengaged position.

26. The round baler set forth in claim 24, wherein the base portion of the retractable member is positioned adjacent an exterior surface of the first side wall.

27. The round baler set forth in claim 19, wherein the retractable member is rotatable about a holder rotation axis, and wherein the latch portion is disposed forward of the holder rotation axis.

28. The round baler set forth in claim 27, wherein the retractable member includes a base portion and a tooth portion extending from the base portion at a location spaced from the holder rotation axis, with the tooth portion disposed rearward of the holder rotation axis.

29. The round baler set forth in claim 19, wherein the latch portion includes a hook operable to grasp the first side wall in interlocking engagement.

\* \* \* \* \*